US012529479B2

(12) United States Patent
Storiz et al.

(10) Patent No.: US 12,529,479 B2
(45) Date of Patent: Jan. 20, 2026

(54) TWO-LEVEL RAPID COOKING OVEN AND MULTI-TIERED RACK ASSEMBLY FOR THE SAME

(71) Applicant: ILLINOIS TOOL WORKS INC., Glenview, IL (US)

(72) Inventors: Paul Storiz, Glenview, IL (US); Christopher Hopper, Buffalo Grove, IL (US); Dionysios Tsiogkas, Des Plaines, IL (US); Joshua Linton, Winnetka, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 484 days.

(21) Appl. No.: 17/955,836

(22) Filed: Sep. 29, 2022

(65) Prior Publication Data

US 2023/0136782 A1 May 4, 2023

Related U.S. Application Data

(60) Provisional application No. 63/274,086, filed on Nov. 1, 2021.

(51) Int. Cl.
*F24C 15/16* (2006.01)
*F24C 7/02* (2006.01)
*H05B 6/64* (2006.01)

(52) U.S. Cl.
CPC .............. *F24C 15/16* (2013.01); *F24C 7/02* (2013.01); *H05B 6/6408* (2013.01)

(58) Field of Classification Search
CPC .. H05B 6/6408; H05B 6/6473; H05B 6/6485; F24C 15/16; F24C 7/02
(Continued)

(56) References Cited

U.S. PATENT DOCUMENTS

| 903,834 A | * | 11/1908 | Boeddener | F24C 15/08 126/39 C |
| 1,637,303 A | * | 7/1927 | Heath | F24C 15/16 126/337 R |

(Continued)

FOREIGN PATENT DOCUMENTS

| DE | 102017101166 A1 | 7/2018 | |
| EP | 1419721 A1 * | 5/2004 | ............. A47J 27/04 |

(Continued)

OTHER PUBLICATIONS

Partial European Search Report of related European Application No. 22200187.7 mailed Mar. 20, 2023, all enclosed pages cited.

*Primary Examiner* — Steven B McAllister
*Assistant Examiner* — Xiaoting Hu
(74) *Attorney, Agent, or Firm* — Burr & Forman

(57) ABSTRACT

A multi-tier rack assembly for use in an oven including a cooking chamber, a convective heating system configured to provide heated air into the cooking chamber, and a radio frequency (RF) heating system configured to provide RF energy into the cooking chamber may include a bottom tier rack and a top tier rack. The bottom tier rack may be removable/insertable relative to the cooking chamber to be supported at a bottom wall of the cooking chamber. The bottom tier rack may include a first frame including a plurality of first frame members that surround a first grate structure. The top tier rack may be removable/insertable to be supported by the bottom tier rack. The top tier rack may include a second frame including a plurality of second frame members that surround a second grate structure. Each of the bottom tier rack and the top tier rack may define a lateral gap proximate to sidewalls of the cooking chamber and a rear gap proximate to a back wall of the cooking chamber to permit, along with the first and second grate structures, (Continued)

airflow vertically through, along sides, and along a back of the bottom and top tier racks, respectively.

20 Claims, 11 Drawing Sheets

(58) Field of Classification Search
USPC .............. 126/332, 337 R, 333; 219/762, 763
See application file for complete search history.

(56) References Cited

U.S. PATENT DOCUMENTS

| | | | | |
|---|---|---|---|---|
| 2,248,198 A * | 7/1941 | Ratz | ........................ | F24C 15/14 |
| | | | | 99/425 |
| 2,778,911 A * | 1/1957 | Valentine | .............. | F24C 15/004 |
| | | | | 219/738 |
| 4,455,467 A * | 6/1984 | Dills | ........................ | F24C 15/16 |
| | | | | 219/732 |
| 5,698,128 A * | 12/1997 | Sakai | .................... | H05B 6/6426 |
| | | | | 219/745 |
| 2013/0014741 A1 * | 1/2013 | Palla | .................... | A47J 37/0694 |
| | | | | 126/337 R |
| 2013/0092680 A1 * | 4/2013 | Cartwright | ............. | H05B 6/687 |
| | | | | 219/622 |
| 2013/0118473 A1 | 5/2013 | Linton | | |
| 2013/0119053 A1 * | 5/2013 | Linton | .................... | F24C 15/16 |
| | | | | 219/762 |
| 2018/0152999 A1 * | 5/2018 | Rollet | .................... | H05B 6/6435 |
| 2022/0243923 A1 * | 8/2022 | Huijsing | .................... | A23L 5/15 |

FOREIGN PATENT DOCUMENTS

| | | | | |
|---|---|---|---|---|
| EP | 3549396 B1 | 9/2020 | | |
| JP | 2000018599 A * | 1/2000 | ........... | F24C 15/006 |
| JP | 2006112722 A * | 4/2006 | | |

* cited by examiner

TWO-LEVEL RAPID COOKING OVEN AND MULTI-TIERED RACK ASSEMBLY FOR THE SAME

TECHNICAL FIELD

Example embodiments generally relate to ovens and, more particularly, relate to provision of cookware appliances for providing multiple tiers within an oven that is enabled to cook using radio frequency (RF).

BACKGROUND

Combination ovens that are capable of cooking using more than one heating source (e.g., convection, steam, microwave, etc.) have been in use for decades. Each cooking source comes with its own distinct set of characteristics. Thus, a combination oven can typically leverage the advantages of each different cooking source to attempt to provide a cooking process that is improved in terms of time and/or quality. More recently, ovens with improved capabilities relative to cooking food with a combination of controllable RF energy and convection energy have been introduced. Unlike the relatively indiscriminate bombarding of food product, which generally occurs in microwave cooking, the use of controllable RF energy can enable a much more fine-tuned control of the cooking process. This fine-tuned control of the cooking process can lead to superior results in vastly shortened time periods.

The improved speed and accuracy of cooking with RF can be advantageous in many contexts. However, these ovens also have unique characteristics by virtue of the features made available in connection with the application of the heat sources involved. Cooking sequences must be organized in light of the expected results associated with each energy source that is to be employed. That said, factors such as air speed, time, temperature, and sequencing may not be the only factors that impact cooking characteristics. In this regard, internal characteristics of the oven structure may also impact the cooking characteristics. As such, any effort to add multiple cooking locations within the oven may impact the cooking characteristics.

Accordingly, it may be desirable to develop structures to provide an oven capable of utilizing the advantages of RF cooking, but nevertheless be flexible enough to permit cooking of food product at either a single location or at multiple locations (e.g., multiple tiers or levels) within a cooking chamber of the oven.

BRIEF SUMMARY OF SOME EXAMPLES

In an example embodiment, an oven is provided. The oven may include a cooking chamber, a convective heating system configured to provide heated air into the cooking chamber, a radio frequency (RF) heating system configured to provide RF energy into the cooking chamber, a bottom tier rack that is removable from and insertable into the cooking chamber to be supported at a bottom wall of the cooking chamber, and a top tier rack that is removable from and insertable into the cooking chamber to be supported by the bottom tier rack. The bottom tier rack includes a first frame including a plurality of first frame members that surround a first grate structure. The top tier rack includes a second frame including a plurality of second frame members that surround a second grate structure. Each of the bottom tier rack and the top tier rack may define a lateral gap proximate to sidewalls of the cooking chamber and a rear gap proximate to a back wall of the cooking chamber to permit, along with the first and second grate structures, airflow vertically through, along sides, and along a back of the bottom and top tier racks, respectively.

In another example embodiment, multi-tier rack assembly for use in an oven including a cooking chamber, a convective heating system configured to provide heated air into the cooking chamber, and a radio frequency (RF) heating system configured to provide RF energy into the cooking chamber may be provided. The assembly may include a bottom tier rack and a top tier rack. The bottom tier rack may be removable/insertable relative to the cooking chamber to be supported at a bottom wall of the cooking chamber. The bottom tier rack may include a first frame including a plurality of first frame members that surround a first grate structure. The top tier rack may be removable/insertable to be supported by the bottom tier rack. The top tier rack may include a second frame including a plurality of second frame members that surround a second grate structure. Each of the bottom tier rack and the top tier rack may define a lateral gap proximate to sidewalls of the cooking chamber and a rear gap proximate to a back wall of the cooking chamber to permit, along with the first and second grate structures, airflow vertically through, along sides, and along a back of the bottom and top tier racks, respectively.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
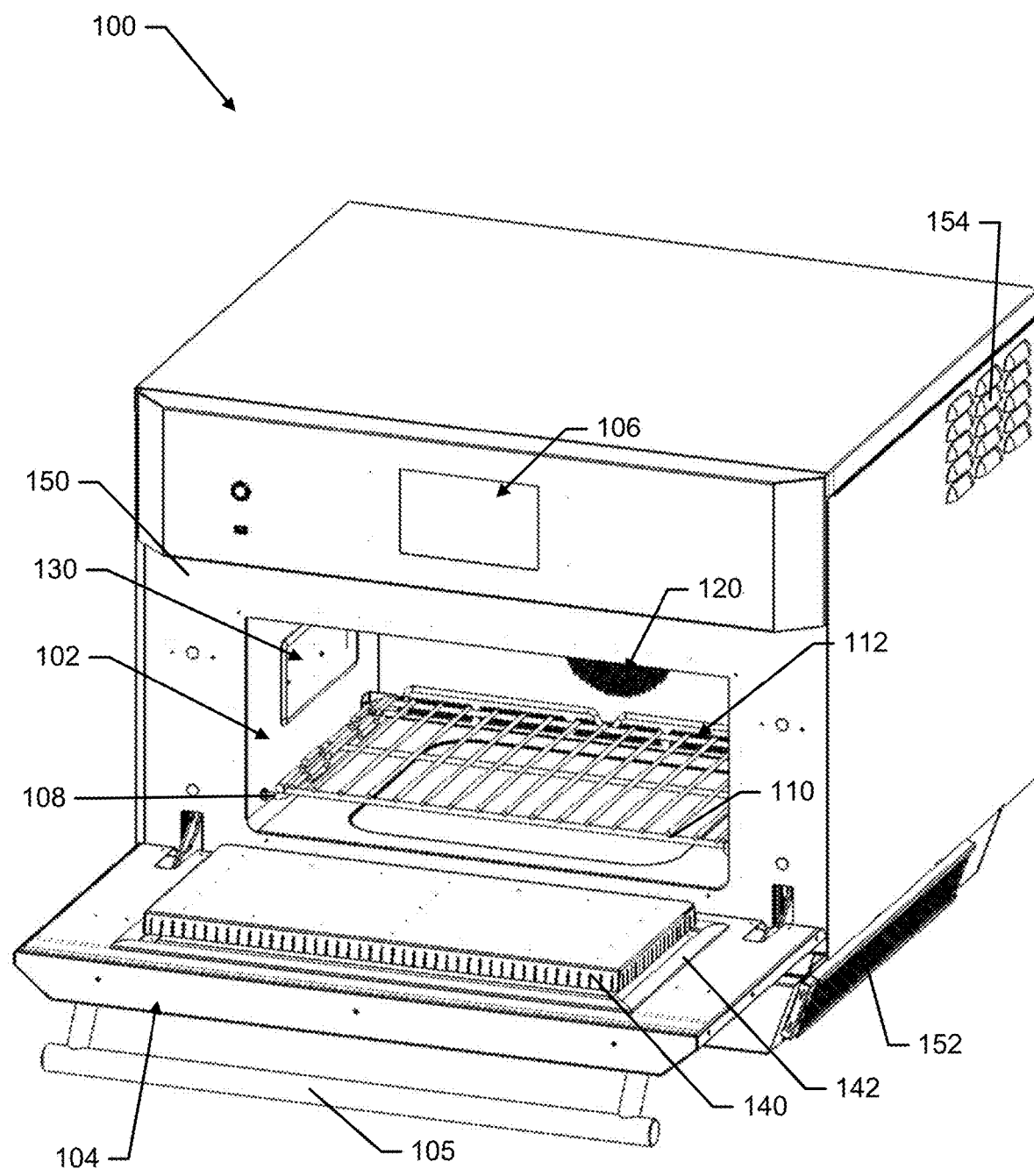
FIG. 1 illustrates a perspective view of an oven capable of employing at least two energy sources according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the cooking performance of an oven and/or may improve the operator experience of individuals employing an example embodiment. In this regard, since some example embodiments may provide the operator with increased flexibility and versatility relative to food item positioning, the operator may take better advantage of the characteristics of the oven. As an example, the operator may place food items so that RF cooking and browning characteristics may be utilized to place items more or less within the airflow path of the heated airstream (e.g., that may be used for product browning) by controlling food product elevation. Alternatively or additionally, elevation or positioning of food product using racks designed with specific RF and airflow restriction characteristics in mind within the oven may avoid having one item or the racks themselves block energy from being communicated to another item. Further still, elevation or positioning of food products may alter the RF cross section of certain items. Thus, in some cases, a better cooked product may be achieved in terms of consistent heating (and in some cases also browning) by providing an ability to disperse food items over elevated cooking platforms within the oven.

FIG. 1 illustrates a perspective view of an oven 100 according to an example embodiment. As shown in FIG. 1, the oven 100 may include a cooking chamber 102 into which a food product may be placed for the application of heat by any of at least two energy sources that may be employed by the oven 100. The cooking chamber 102 may include a door 104 and an interface panel 106, which may sit proximate to the door 104 when the door 104 is closed. The door 104 may be operable via handle 105, which may extend across the front of the oven 100 parallel to the ground. In some cases, the interface panel 106 may be located substantially above the door 104 (as shown in FIG. 1) or alongside the door 104 in alternative embodiments. In an example embodiment, the interface panel 106 may include a touch screen display capable of providing visual indications to an operator and further capable of receiving touch inputs from the operator. The interface panel 106 may be the mechanism by which instructions are provided to the operator, and the mechanism by which feedback is provided to the operator regarding cooking process status, options and/or the like.

In some embodiments, the oven 100 may include one or multiple racks or may include rack (or pan) supports 108 or guide slots in order to facilitate the insertion of one or more racks 110 or pans holding food product that is to be cooked. In an example embodiment, air delivery orifices 112 may be positioned proximate to the rack supports 108 (e.g., just below a level of the rack supports in one embodiment) to enable heated air to be forced into the cooking chamber 102 via a heated-air circulation fan (not shown in FIG. 1). The heated-air circulation fan may draw air in from the cooking chamber 102 via a chamber outlet port 120 disposed at a back or rear wall (i.e., a wall opposite the door 104) of the cooking chamber 102. Air may be circulated from the chamber outlet port 120 back into the cooking chamber 102 via the air delivery orifices 112. After removal from the cooking chamber 102 via the chamber outlet port 120, air may be cleaned, heated, and pushed through the system by other components prior to return of the clean, hot and speed controlled air back into the cooking chamber 102. This air circulation system, which includes the chamber outlet port 120, the air delivery orifices 112, the heated-air circulation fan, cleaning components, and all ducting therebetween, may form a first air circulation system within the oven 100. The air delivery orifices 112 may form a rectangular array of holes in the back wall that are proximate to a bottom wall of the cooking chamber 102, and the chamber outlet port 120 may be a circular array of holes in a middle portion of the back wall. In some cases, another array of air delivery orifices similar in shape to that of the air delivery orifices 112 of FIG. 1, but positioned proximate to a top wall of the cooking chamber 102 may also be provided.

In an example embodiment, food product placed on a pan or one of the racks 110 (or simply on a base of the cooking chamber 102 in embodiments where racks 110 are not employed) may be heated at least partially using radio frequency (RF) energy. Meanwhile, the airflow that may be provided may be heated to enable further heating or even browning to be accomplished by convection. Of note, a metallic pan may be placed on one of the rack supports 108 or racks 110 of some example embodiments. However, the oven 100 may be configured to employ frequencies and/or mitigation strategies for detecting and/or preventing any arcing that might otherwise be generated by using RF energy with metallic components.

Figure 7:
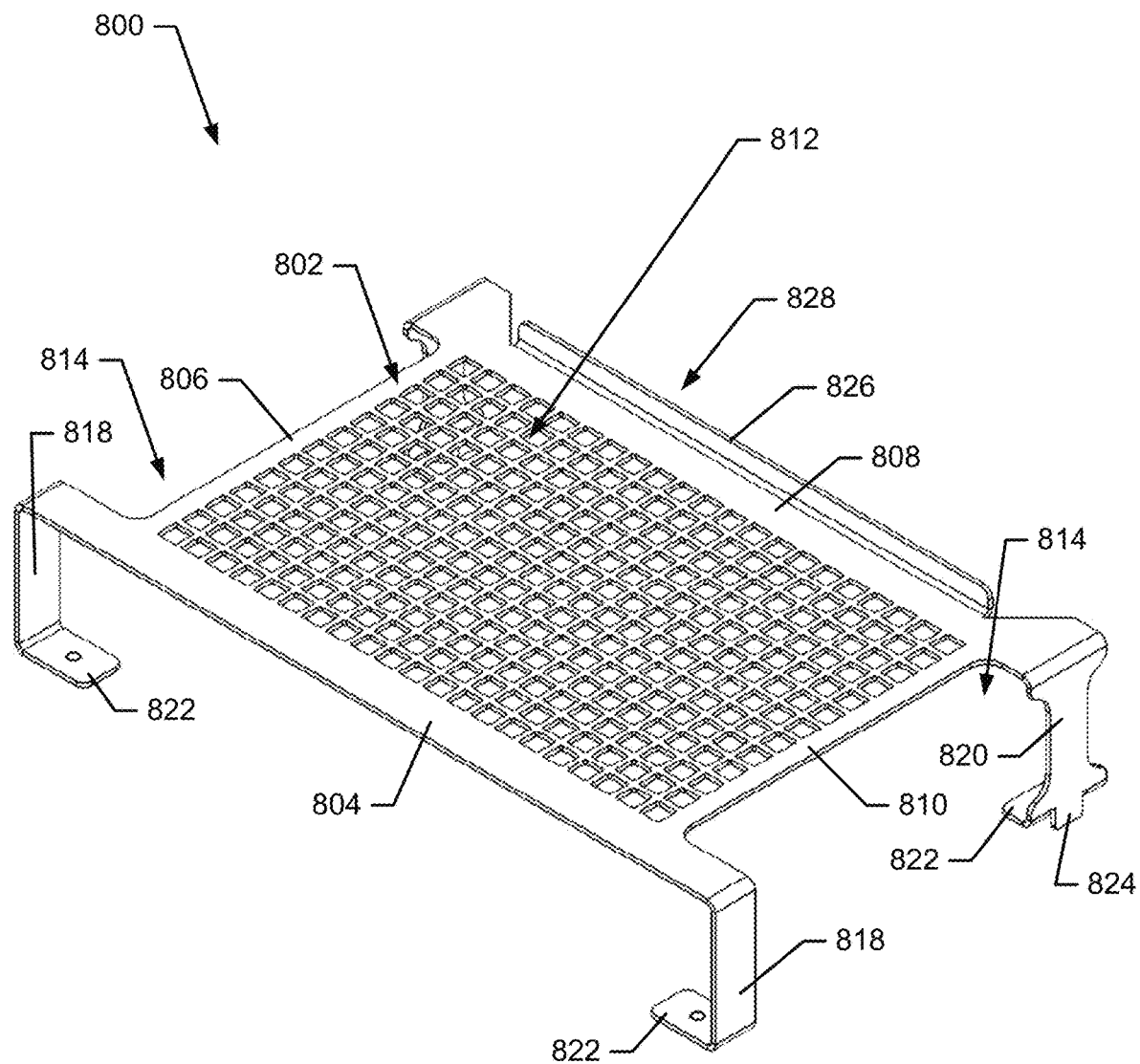
FIG. 7 is a perspective view of a top tier rack in accordance with an example embodiment.
Figure 8:
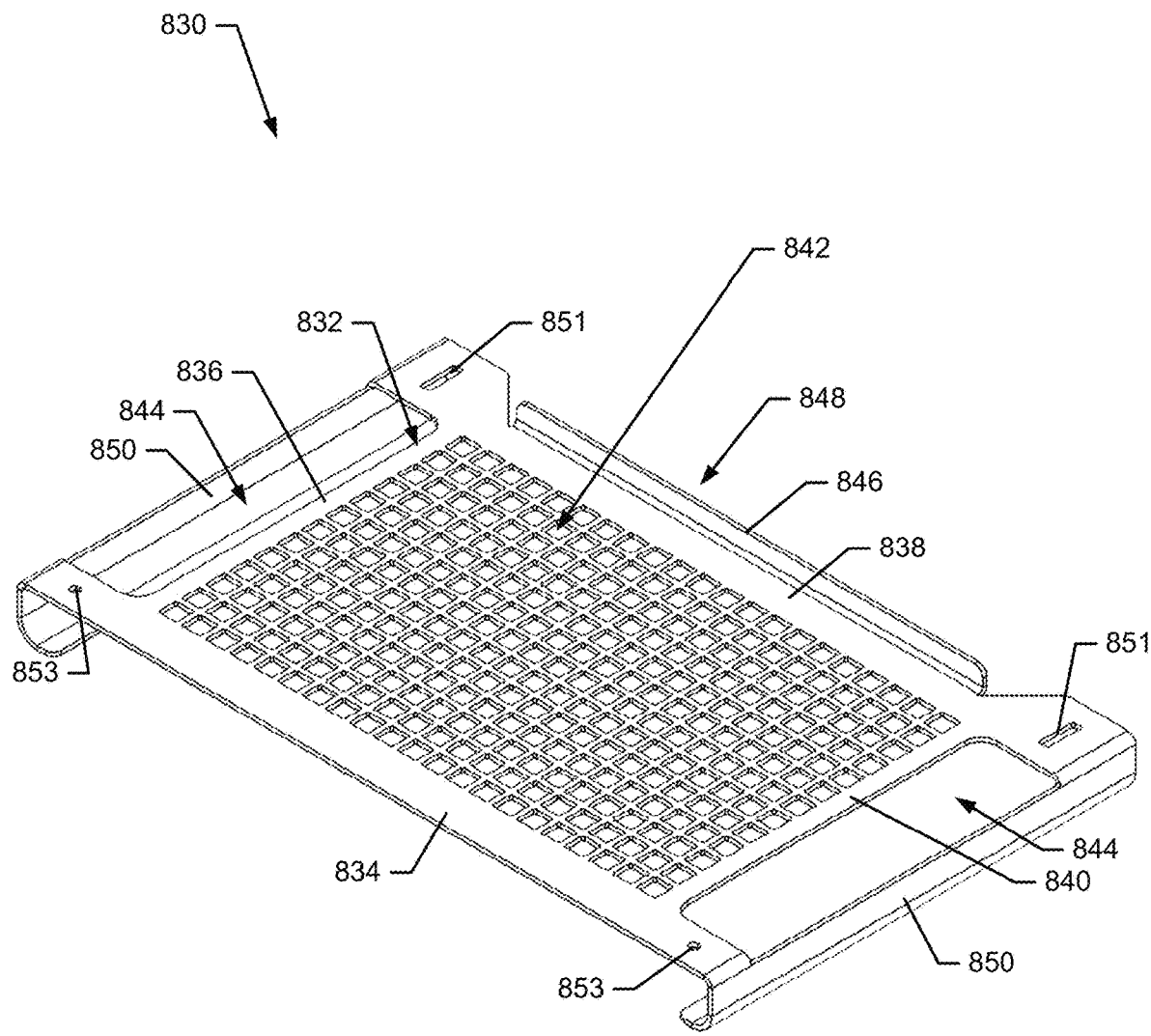
FIG. 8 is a perspective view of a bottom tier rack in accordance with an example embodiment.

Meanwhile, in some example embodiments, an elevated rack insert may be provided to sit on top of the rack 110 shown in FIG. 1 to provide a second cooking location that is elevated and thereby creates a second tier on which food products or pans may be placed. An example of such an elevated rack insert is described in greater detail in reference to FIG. 7 below. However, in alternative embodiments, the rack 110 of FIG. 1 may also be replaced by a separate removable rack insert, an example of which is shown in FIG. 8. In such an example, there may be no need for rack supports 108, and the rack supports 108 and rack 110 may be entirely omitted.

In an example embodiment, the RF energy may be delivered to the cooking chamber 102 via an antenna assembly 130 disposed proximate to the cooking chamber 102. In some embodiments, multiple components may be provided in the antenna assembly 130, and the components may be placed on opposing sides of the cooking chamber 102. The antenna assembly 130 may include one or more instances of a power amplifier, a launcher, waveguide and/or the like that are configured to couple RF energy into the cooking chamber 102.

The cooking chamber 102 may be configured to provide RF shielding on five sides thereof (e.g., the top, bottom, back, and right and left sides), but the door 104 may include a choke 140 to provide RF shielding for the front side. The choke 140 may therefore be configured to fit closely with the opening defined at the front side of the cooking chamber 102 to prevent leakage of RF energy out of the cooking chamber 102 when the door 104 is shut and RF energy is being applied into the cooking chamber 102 via the antenna assembly 130.

In an example embodiment, a gasket 142 may be provided to extend around the periphery of the choke 140. In this regard, the gasket 142 may be formed from a material such as wire mesh, rubber, silicon, or other such materials that may be somewhat compressible between the door 104 and a periphery of the opening into the cooking chamber 102. The gasket 142 may, in some cases, provide a substantially air tight seal. However, in other cases (e.g., where the wire mesh is employed), the gasket 142 may allow air to pass therethrough. Particularly in cases where the gasket 142 is substantially air tight, it may be desirable to provide an air cleaning system in connection with the first air circulation system described above.

The antenna assembly 130 may be configured to generate controllable RF emissions into the cooking chamber 102 using solid state components. Thus, the oven 100 may not employ any magnetrons, but instead use only solid state components for the generation and control of the RF energy applied into the cooking chamber 102. The use of solid state components may provide distinct advantages in terms of allowing the characteristics (e.g., power/energy level, phase and frequency) of the RF energy to be controlled to a greater degree than is possible using magnetrons. However, since relatively high powers are necessary to cook food, the solid state components themselves will also generate relatively high amounts of heat, which must be removed efficiently in order to keep the solid state components cool and avoid damage thereto. To cool the solid state components, the oven 100 may include a second air circulation system.

The second air circulation system may operate within an oven body 150 of the oven 100 to circulate cooling air for preventing overheating of the solid state components that power and control the application of RF energy to the cooking chamber 102. The second air circulation system may include an inlet array 152 that is formed at a bottom (or basement) portion of the oven body 150. In particular, the basement region of the oven body 150 may be a substantially hollow cavity within the oven body 150 that is disposed below the cooking chamber 102. The inlet array 152 may include multiple inlet ports that are disposed on each opposing side of the oven body 150 (e.g., right and left sides when viewing the oven 100 from the front) proximate to the basement, and also on the front of the oven body 150 proximate to the basement. Portions of the inlet array 152 that are disposed on the sides of the oven body 150 may be formed at an angle relative to the majority portion of the oven body 150 on each respective side. In this regard, the portions of the inlet array 152 that are disposed on the sides of the oven body 150 may be tapered toward each other at an angle of about twenty degrees (e.g., between ten degrees and thirty degrees). This tapering may ensure that even when the oven 100 is inserted into a space that is sized precisely wide enough to accommodate the oven body 150 (e.g., due to walls or other equipment being adjacent to the sides of the oven body 150), a space is formed proximate to the basement to permit entry of air into the inlet array 152. At the front portion of the oven body 150 proximate to the basement, the corresponding portion of the inlet array 152 may lie in the same plane as (or at least in a parallel plane to) the front of the oven 100 when the door 104 is closed. No such tapering is required to provide a passage for air entry into the inlet array 152 in the front portion of the oven body 150 since this region must remain clear to permit opening of the door 104.

From the basement, ducting may provide a path for air that enters the basement through the inlet array 152 to move upward (under influence from a cool-air circulating fan) through the oven body 150 to an attic portion inside which control electronics (e.g., the solid state components) are located. The attic portion may include various structures for ensuring that the air passing from the basement to the attic and ultimately out of the oven body 150 via outlet louvers 154 is passed proximate to the control electronics to remove heat from the control electronics. Hot air (i.e., air that has removed heat from the control electronics) is then expelled from the outlet louvers 154. In some embodiments, outlet louvers 154 may be provided at right and left sides of the oven body 150 and at the rear of the oven body 150 proximate to the attic. Placement of the inlet array 152 at the basement and the outlet louvers 154 at the attic ensures that the normal tendency of hotter air to rise will prevent recirculation of expelled air (from the outlet louvers 154) back through the system by being drawn into the inlet array 152. Furthermore, the inlet array 152 is at least partially shielded from any direct communication path from the outlet louvers 154 by virtue of the fact that, at the oven sides (which include both portions of the inlet array 152 and outlet louvers 154), the shape of the basement is such that the tapering of the inlet array 152 is provided on walls that are also slightly inset to create an overhang 158 that blocks any air path between inlet and outlet. As such, air drawn into the inlet array 152 can reliably be expected to be air at ambient room temperature, and not recycled, expelled cooling air.

Figure 2:
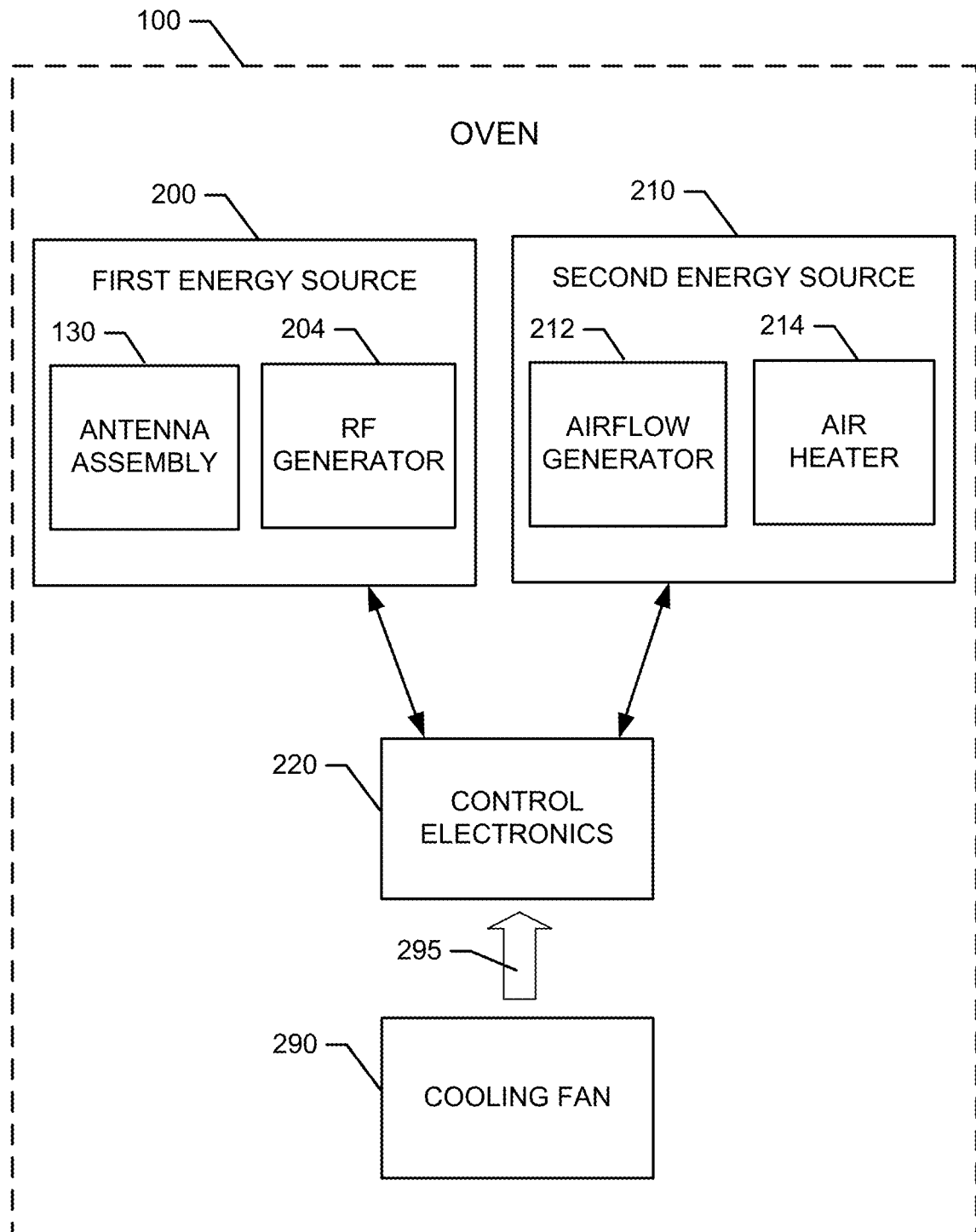
FIG. 2 illustrates a functional block diagram of the oven of FIG. 1 according to an example embodiment.

FIG. 2 illustrates a functional block diagram of the oven 100 according to an example embodiment. As shown in FIG. 2, the oven 100 may include at least a first energy source 200 and a second energy source 210. The first and second energy sources 200 and 210 may each correspond to respective different cooking methods. In some embodiments, the first and second energy sources 200 and 210 may be an RF heating source and a convective heating source, respectively. However, it should be appreciated that additional or alternative energy sources may also be provided in some embodiments.

As mentioned above, the first energy source 200 may be an RF energy source (or RF heating source) configured to generate relatively broad spectrum RF energy or a specific narrow band, phase controlled energy source to cook food product placed in the cooking chamber 102 of the oven 100. Thus, for example, the first energy source 200 may include the antenna assembly 130 and an RF generator 204. The RF generator 204 of one example embodiment may be configured to generate RF energy at selected levels and with selected frequencies and phases. In some cases, the frequencies may be selected over a range of about 6 MHz to 246 GHz. However, other RF energy bands may be employed in some cases. In some examples, frequencies may be selected from unlicensed frequency (e.g., the ISM) bands for application by the RF generator 204.

In some cases, the antenna assembly 130 may be configured to transmit the RF energy into the cooking chamber 102 and receive feedback to indicate absorption levels of respective different frequencies in the food product. The absorption levels may then be used to control the generation of RF energy to provide balanced cooking of the food product. Feedback indicative of absorption levels is not necessarily employed in all embodiments however. For example, some embodiments may employ algorithms for selecting frequency and phase based on pre-determined strategies identified for particular combinations of selected cook times, power levels, food types, recipes and/or the like. In some embodiments, the antenna assembly 130 may include multiple antennas, waveguides, launchers, and RF transparent coverings that provide an interface between the antenna assembly 130 and the cooking chamber 102. Thus, for example, four waveguides may be provided and, in some cases, each waveguide may receive RF energy generated by its own respective power module or power amplifier of the RF generator 204 operating under the control of control electronics 220. In an alternative embodiment, a single multiplexed generator may be employed to deliver different energy into each waveguide or to pairs of waveguides to provide energy into the cooking chamber 102.

In an example embodiment, the second energy source 210 may be an energy source capable of inducing browning and/or convective heating of the food product. Thus, for example, the second energy source 210 may a convection heating system including an airflow generator 212 and an air heater 214. The airflow generator 212 may be embodied as or include the heated-air circulation fan or another device capable of driving airflow through the cooking chamber 102 (e.g., via the air delivery orifices 112). The air heater 214 may be an electrical heating element or other type of heater that heats air to be driven toward the food product by the airflow generator 212. Both the temperature of the air and the speed of airflow will impact cooking times that are achieved using the second energy source 210, and more particularly using the combination of the first and second energy sources 200 and 210.

In an example embodiment, the first and second energy sources 200 and 210 may be controlled, either directly or indirectly, by the control electronics 220. The control electronics 220 may be configured to receive inputs descriptive of the selected recipe, food product and/or cooking conditions in order to provide instructions or controls to the first and second energy sources 200 and 210 to control the cooking process. In some embodiments, the control electronics 220 may be configured to receive static and/or dynamic inputs regarding the food product and/or cooking conditions. Dynamic inputs may include feedback data regarding phase and frequency of the RF energy applied to the cooking chamber 102. In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), a selection of a recipe (e.g., defining a series of cooking steps) and/or the like.

In some embodiments, the control electronics 220 may be configured to also provide instructions or controls to the airflow generator 212 and/or the air heater 214 to control airflow through the cooking chamber 102. However, rather than simply relying upon the control of the airflow generator 212 to impact characteristics of airflow in the cooking chamber 102, some example embodiments may further employ the first energy source 200 to also apply energy for cooking the food product so that a balance or management of the amount of energy applied by each of the sources is managed by the control electronics 220.

In an example embodiment, the control electronics 220 may be configured to access algorithms and/or data tables that define RF cooking parameters used to drive the RF generator 204 to generate RF energy at corresponding levels, phases and/or frequencies for corresponding times determined by the algorithms or data tables based on initial condition information descriptive of the food product and/or based on recipes defining sequences of cooking steps. As such, the control electronics 220 may be configured to employ RF cooking as a primary energy source for cooking the food product, while the convective heat application is a secondary energy source for browning and faster cooking. However, other energy sources (e.g., tertiary or other energy sources) may also be employed in the cooking process.

In some cases, cooking programs or recipes may be provided to define the cooking parameters to be employed for each of multiple potential cooking stages or steps that may be defined for the food product and the control electronics 220 may be configured to access and/or execute the cooking programs or recipes (all of which may generally be referred to herein as recipes). In some embodiments, the control electronics 220 may be configured to determine which recipe to execute based on inputs provided by the user except to the extent that dynamic inputs (i.e., changes to cooking parameters while a program is already being executed) are provided. However, in other examples, the user may directly select a recipe for execution. The recipe may be descriptive of items to be cooked, and information about such items in their initial and/or final state (e.g., level of doneness). Meanwhile, the control electronics 220 may determine specific details regarding frequency, phase, temperature, fan speed, time, etc. However, the user may also provide some input regarding the details in some cases.

In an example embodiment, an input to the control electronics 220 may also include browning instructions. In this regard, for example, the browning instructions may include instructions regarding the air speed, air temperature and/or time of application of a set air speed and temperature combination (e.g., start and stop times for certain speed and heating combinations). The browning instructions may be provided via a user interface accessible to the operator, or may be part of the cooking programs or recipes.

As discussed above, the first air circulation system may be configured to drive heated air through the cooking chamber 102 to maintain a steady cooking temperature within the cooking chamber 102. Meanwhile, the second air circulation system may cool the control electronics 220. The first and second air circulation systems may be isolated from each other. However, each respective system generally uses differential pressures (e.g., created by fans) within various compartments formed in the respective systems to drive the corresponding air flows needed for each system. While the airflow of the first air circulation system is aimed at heating food in the cooking chamber 102, the airflow of the second air circulation system is aimed at cooling the control electronics 220. As such, cooling fan 290 provides cooling air 295 to the control electronics 220, as shown in FIG. 2.

The structures that form the air cooling pathways via which the cooling fan 290 cools the control electronics 220 may be designed to provide efficient delivery of the cooling air 295 to the control electronics 220, but also minimize fouling issues or dust/debris buildup in sensitive areas of the oven 100, or areas that are difficult to access and/or clean. Meanwhile, the structures that form the air cooling pathways may also be designed to maximize the ability to access and clean the areas that are more susceptible to dust/debris buildup. Furthermore, the structures that form the air cooling pathways via which the cooling fan 290 cools the control electronics 220 may be designed to strategically employ various natural phenomena to further facilitate efficient and effective operation of the second air circulation system. In this regard, for example, the tendency of hot air to rise, and the management of high pressure and low pressure zones necessarily created by the operation of fans within the system may each be employed strategically by the design and placement of various structures to keep certain areas that are hard to access relatively clean and other areas that are otherwise relatively easy to access more likely to be places where cleaning is needed.

Figure 3:
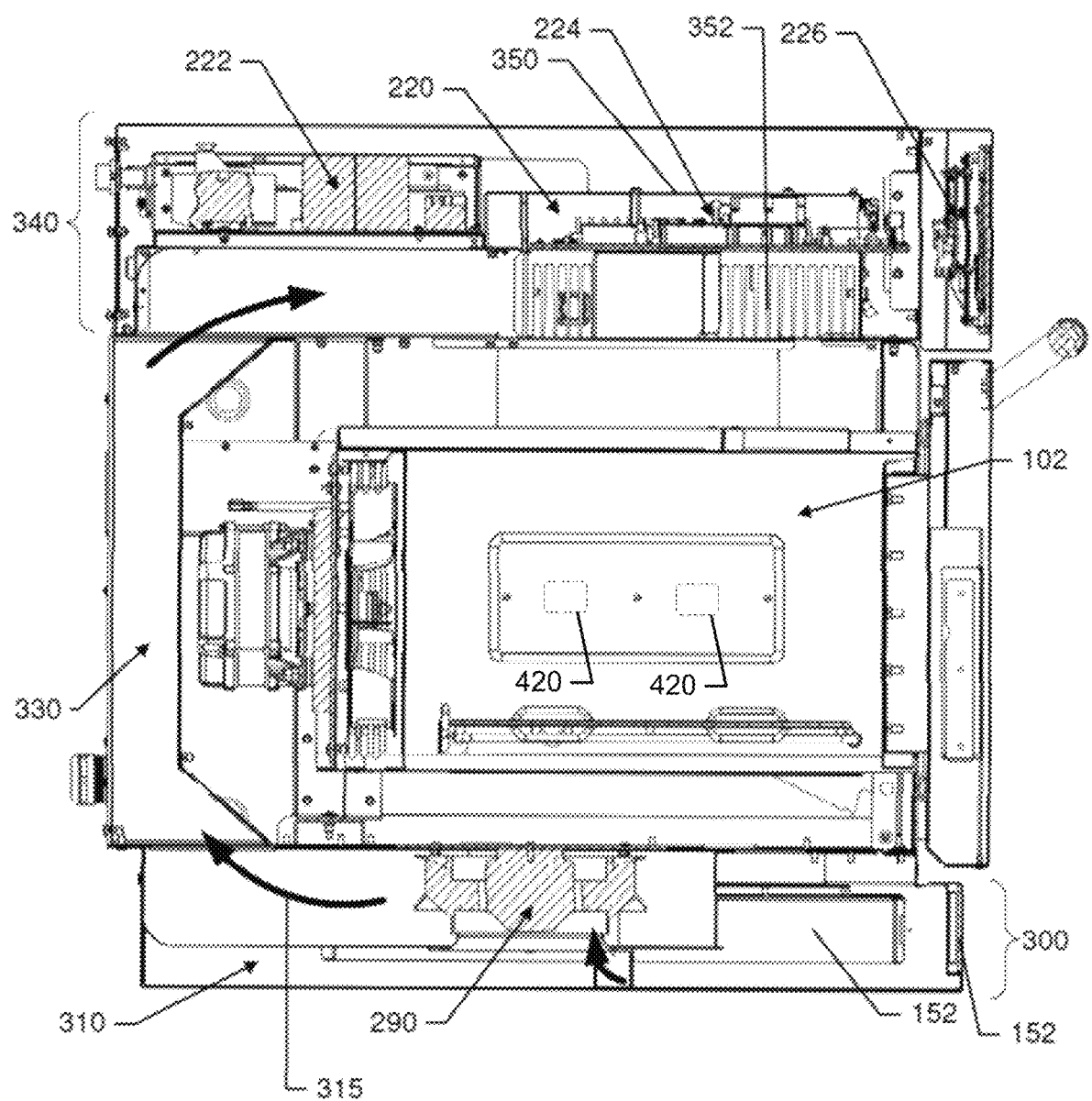
FIG. 3 shows a cross sectional view of the oven from a plane passing from the front to the back of the oven according to an example embodiment.

The typical airflow path, and various structures of the second air circulation system, can be seen in FIG. 3. In this regard, FIG. 3 shows a cross sectional view of the oven 100 from a plane passing from the front to the back of the oven 100. The basement (or basement region 300) of the oven 100 is defined below the cooking chamber 102, and includes an inlet cavity 310. During operation, air is drawn into the inlet cavity 310 through the inlet array 152 and is further drawn into the cooling fan 290 before being forced radially outward (as shown by arrow 315) away from the cooling fan 290 into a riser duct 330 (e.g., a chimney) that extends from the basement region 300 to the attic (or attic region 340) to turn air upward (as shown by arrow 315). Air is forced upward through the riser duct 330 into the attic region 340, which is where components of the control electronics 220 are disposed. The air then cools the components of the control electronics 220 before exiting the body 150 of the oven 100 via the outlet louvers 154. The components of the control electronics 220 may include power supply electronics 222, power amplifier electronics 224 and display electronics 226.

Upon arrival of air into the attic region 340, the air is initially guided from the riser duct 330 to a power amplifier casing 350. The power amplifier casing 350 may house the power amplifier electronics 224. In particular, the power amplifier electronics 224 may sit on an electronic board to which all such components are mounted. The power amplifier electronics 224 may therefore include one or more power amplifiers that are mounted to the electronic board for powering the antenna assembly 130. Thus, the power amplifier electronics 224 may generate a relatively large heat load. To facilitate dissipation of this relatively large heat load, the power amplifier electronics 224 may be mounted to one or more heat sinks 352. In other words, the electronic board may be mounted to the one or more heat sinks 352. The heat sinks 352 may include large metallic fins that extend away from the circuit board to which the power amplifier electronics 224 are mounted. Thus, the fins may extend downwardly (toward the cooking chamber 102). The fins may also extend in a transverse direction away from a centerline (from front to back) of the oven 100 to guide air provided into the power amplifier casing 350 and past the fins of the heat sinks 352.

Figure 4:
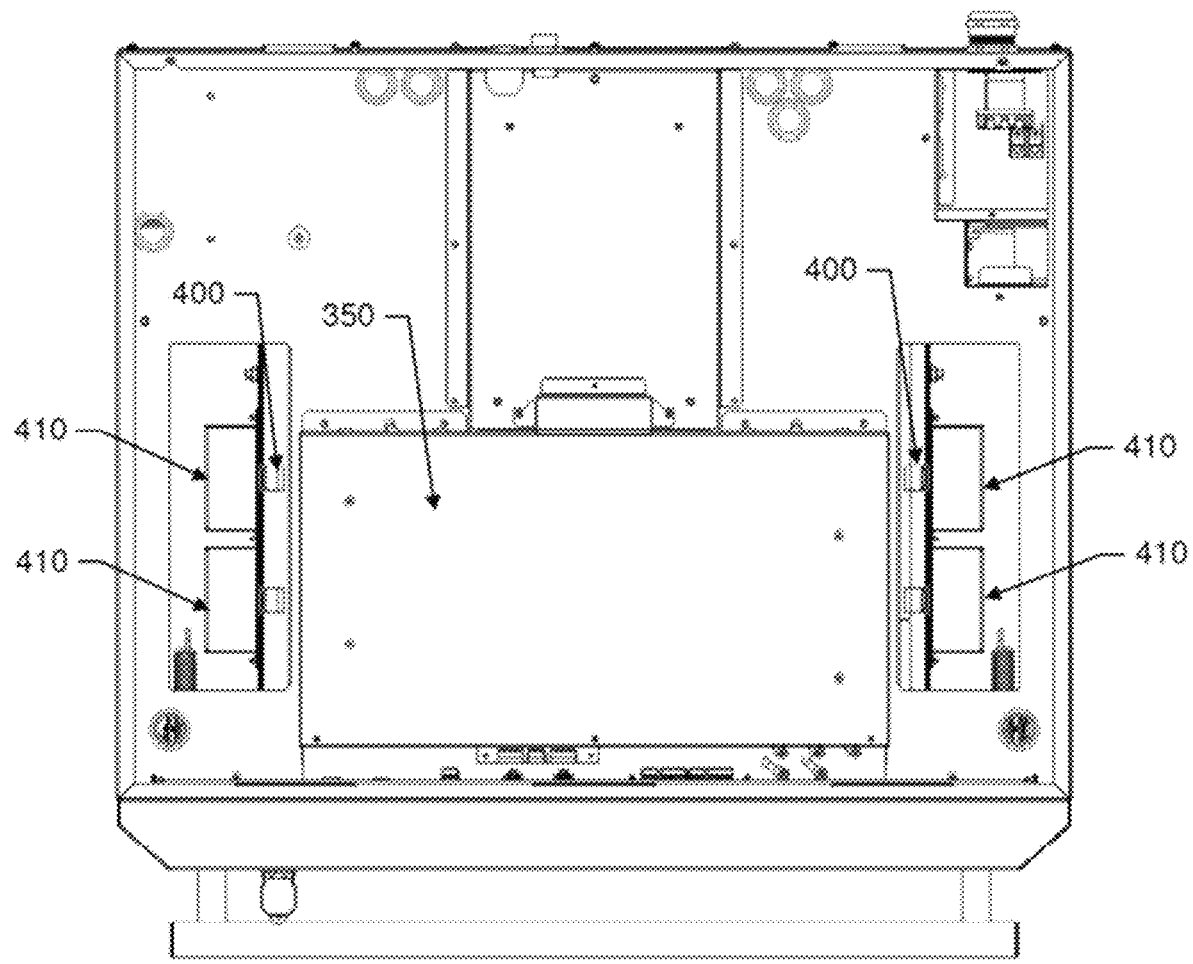
FIG. 4 is a top view of an attic region of the oven in accordance with an example embodiment.

FIG. 4 illustrates a top view of the attic region 340, and shows the power amplifier casing 350 and various components of the antenna assembly 130 including a launcher assembly 400 and waveguides of a waveguide assembly 410. Power is provided from the power amplifier electronics 224 to each launcher of the launcher assembly 400. The launcher assembly 400 operably couples a signal generated by the power amplifiers of the power amplifier electronics 224 into a corresponding one of the waveguides of the waveguide assembly 410 for communication of the corresponding signal into the cooking chamber 102 via the antenna assembly 130 as described above. In an example embodiment, each instance of the waveguide assembly 410 may have a corresponding RF entry point 420 located near a bottom portion of the waveguide and in a sidewall of the cooking chamber 102 (see FIG. 3) to provide the RF into the cooking chamber 102. A cover that is invisible to RF, but restricts the flow of air may be provided over the RF entry points 420. In an example embodiment, the RF entry points 420 may be at a predetermined height within the cooking chamber 102.

The power amplifier electronics 224 are defined by a plurality of electronic circuitry components including opamps, transistors and/or the like that are configured to generate waveforms at the corresponding power levels, frequencies and phases that are desired for a particular situation or cooking program. In some cases, the cooking program may select an algorithm for control of the power amplifier electronics 224 to direct RF emissions into the cooking chamber 102 at selected power levels, frequencies and phases. One or more learning processes may be initiated to select one or more corresponding algorithms to guide the power application. The learning processes may include detection of feedback on the efficacy of the application of power at specific frequencies (and/or phases) into the cooking chamber 102. In order to determine the efficacy, in some cases, the learning processes may measure efficiency and compare the efficiency to one or more thresholds. Efficiency may be calculated as the difference between forward power ($P_{fwd}$) and reflected power ($P_{refl}$), divided by the forward power ($P_{fwd}$). As such, for example, the power inserted into the cooking chamber 102 (i.e., the forward power) may be measured along with the reflected power to determine the amount of power that has been absorbed in the food product (or workload) inserted in the cooking chamber 102. The efficiency may then be calculated as: Efficiency (eff)=$(P_{fwd}-P_{refl})/P_{fwd}$.

As can be appreciated from the description above, the measurement of the efficiency of the delivery of RF energy to the food product may be useful in determining how effective a particular (e.g., a current) selection for a combination (or pair) of frequency and phase parameters of RF energy applied into the cooking chamber 102 is at delivering heat energy to the food product. Thus, the measurement of efficiency may be useful for selecting the best combination or algorithm for application of energy. The measurement of efficiency should therefore also desirably be as accurate as possible in order to ensure that meaningful control is affected by monitoring efficiency.

Figure 5:
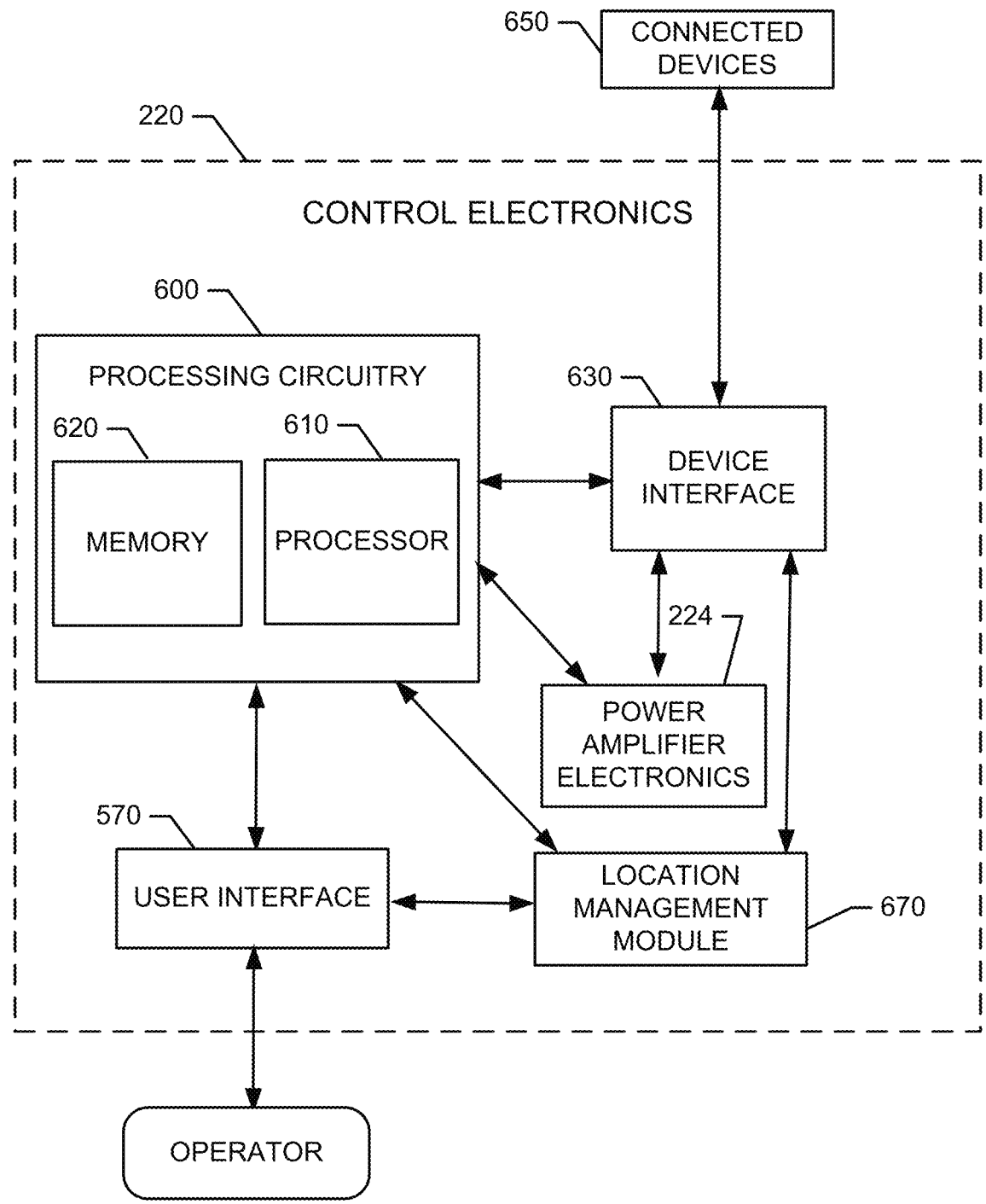
FIG. 5 is a block diagram of control electronics for providing the electronic circuitry for controlling RF application in the oven in accordance with an example embodiment.

FIG. 5 is a block diagram of control electronics 220 for providing the electronic circuitry for instantiation of power cycling during oven operation in accordance with an example embodiment. In some embodiments, the control electronics 220 may include or otherwise be in communication with processing circuitry 600 that is configurable to perform actions in accordance with example embodiments described herein. As such, for example, the functions attributable to the control electronics 220 may be carried out by the processing circuitry 600.

The processing circuitry 600 may be configured to perform data processing, control function execution and/or other processing and management services according to an example embodiment of the present invention. In some embodiments, the processing circuitry 600 may be embodied as a chip or chip set. In other words, the processing circuitry 600 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 600 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 600 may include one or more instances of each of a processor 610 and memory 620 that may be in communication with or otherwise control a device interface 630 and the user interface 570. As such, the processing circuitry 600 may be embodied as a circuit chip (e.g., an integrated circuit chip) configured (e.g., with hardware, software or a combination of hardware and software) to perform operations described herein. However, in some embodiments, the processing circuitry 600 may be embodied as a portion of an on-board computer.

The user interface 570 (which may be embodied as, include, or be a portion of the interface panel 106) may be in communication with the processing circuitry 600 to receive an indication of a user input at the user interface 570 and/or to provide an audible, visual, mechanical or other output to the user (or operator). As such, the user interface 570 may include, for example, a display (e.g., a touch screen such as the interface panel 106), one or more hard or soft buttons or keys, and/or other input/output mechanisms.

The device interface 630 may include one or more interface mechanisms for enabling communication with connected devices 650 such as, for example, other components of the oven 100, sensors of a sensor network of the oven 100, removable memory devices, wireless or wired network communication devices, and/or the like. In some cases, the device interface 630 may be any means such as a device or circuitry embodied in either hardware, or a combination of hardware and software that is configured to receive and/or transmit data from/to sensors that measure any of a plurality of device parameters such as frequency, phase, temperature (e.g., in the cooking chamber 102 or in air passages associated with the second energy source 210), air speed, and/or the like. As such, in one example, the device interface 630 may receive input at least from a temperature sensor that measures the temperatures described above, or receives input from any of the other parameters described above, in order to enable communication of such parameters to the processing circuitry 600 for the performance of certain protective or control functions. Alternatively or additionally, the device interface 630 may provide interface mechanisms for any devices capable of wired or wireless communication with the processing circuitry 600. In still other alternatives, the device interface 630 may provide connections and/or interface mechanisms to enable the processing circuitry 600 to control the various components of the oven 100.

In an example embodiment, the memory 620 may include one or more non-transitory memory devices such as, for example, volatile and/or non-volatile memory that may be either fixed or removable. The memory 620 may be configured to store information, data, cooking programs, recipes, applications, instructions or the like for enabling the control electronics 220 to carry out various functions in accordance with example embodiments of the present invention. For example, the memory 620 could be configured to buffer input data for processing by the processor 610. Additionally or alternatively, the memory 620 could be configured to store instructions for execution by the processor 610. As yet another alternative, the memory 620 may include one or more databases that may store a variety of data sets responsive to input from the sensor network, or responsive to programming of any of various cooking recipes. Among the contents of the memory 620, applications may be stored for execution by the processor 610 in order to carry out the functionality associated with each respective application. In some cases, the applications may include control applications that utilize parametric data to control the application of heat by the first and second energy sources 200 and 210 as described herein. In this regard, for example, the applications may include operational guidelines defining expected cooking speeds for given initial parameters (e.g., food type, size, initial state, location, and/or the like) using corresponding tables of frequencies, phases, RF energy levels, temperatures and air speeds. Thus, some applications that may be executable by the processor 610 and stored in memory 620 may include tables defining combinations of RF energy parameters and air speed and temperature to determine cooking times for certain levels of doneness and/or for the execution of specific cooking recipes. Accordingly, different cooking programs can be executed to generate different RF and/or convective environments to achieve the desired cooking results. In still other examples, data tables may be stored to define calibration values and/or diagnostic values, as described above. Alternatively or additionally, the memory 620 may store applications for defining responses to stimuli including the generation of protective actions and/or notification functions.

The processor 610 may be embodied in a number of different ways. For example, the processor 610 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 610 may be configured to execute instructions stored in the memory 620 or otherwise accessible to the processor 610. As such, whether configured by hardware or by a combination of hardware and software, the processor 610 may represent an entity (e.g., physically embodied in circuitry—such as in the form of processing circuitry 600) capable of performing operations according to example embodiments of the present invention while configured accordingly. Thus, for example, when any instance of the processor 610 is embodied as an ASIC, FPGA or the like, the processor 610 may be specifically configured hardware for conducting the operations described herein. Alternatively, as another example, when the processor 610 is embodied as one or more executors of software instructions, the instructions may specifically configure the processor 610 to perform the operations described herein.

In an example embodiment, the processor 610 (or the processing circuitry 600) may be embodied as, include or otherwise control the control electronics 220 and/or the power amplifier electronics 224. As such, in some embodiments, the processor 610 (or the processing circuitry 600) may be said to cause each of the operations described in connection with the control electronics 220 and/or the power amplifier electronics 224 by directing the control electronics 220 and/or the power amplifier electronics 224, respectively, to undertake the corresponding functionalities responsive to execution of instructions or algorithms configuring the processor 610 (or processing circuitry 600) accordingly. As an example, the control electronics 220 may be configured to control the responses to various stimuli associated with executing the learning procedure discussed above and directing RF application within the oven 100 based on the learning procedure. Moreover, the control electronics 220 may be configured to determine efficiency parameters and take protective actions based on the efficiency parameters, or based on individual ones of the values, measurements and/or parameters that are determined by or received at the control electronics 220 for execution of the learning procedure. In some cases, a separate instance of a processor (or processors) and memory may be associated with different parts of the control electronics 220 (e.g., including separate processors for the control of the power amplifier electronics 224 amongst potentially others).

In an example embodiment, the control electronics 220 may also access and/or execute instructions for control of the RF generator 204 and/or the antenna assembly 130 to control the application of RF energy to the cooking chamber 102. Thus, for example, the operator may provide static inputs to define the type, mass, quantity, or other descriptive parameters (e.g., a recipe) related to the food product(s) disposed within the cooking chamber 102. The control electronics 220 may then utilize the static inputs to locate an algorithm or other program for execution to define the application of RF energy and/or convective energy to be applied within the cooking chamber 102. The control electronics 220 may also monitor dynamic inputs to modify the amount, frequency, phase or other characteristics of the RF energy to be applied within the cooking chamber 102 during the cooking process, and may also perform protective functions. The control electronics 220 may also execute instructions for calibration and/or fault analysis. Accordingly, for example, the control electronics 220 may be configured to act locally to protect the power amplifier electronics 224 via stopping RF application to the cooking chamber 102, via making adjustments to components to provide calibrated outputs, and/or via alerting the user when various abnormal or correctable situations are detected.

As noted above, in some cases it may be desirable to cook on multiple levels within the cooking chamber 102. In some cases, the characteristics of RF absorption and/or airflow experienced by food products placed in each respective one of the multiple levels may be different. To account for such differences, the control electronics 220 of some example embodiments may employ a location management module 670. The location management module 670 may be may be any means such as a device or circuitry operating in accordance with software or otherwise embodied in hardware or a combination of hardware and software (e.g., processor 610 operating under software control, the processor 610 embodied as an ASIC or FPGA specifically configured to perform the operations described herein, or a combination thereof) thereby configuring the device or circuitry to perform the corresponding functions of the location management module 670 as described herein. In this regard, the location management module 670 may be configured to employ location-specific recipe variants, or execute recipes in consideration of location and alter certain recipe parameters based on the location of the food product to which the recipe is being applied.

Figure 6:
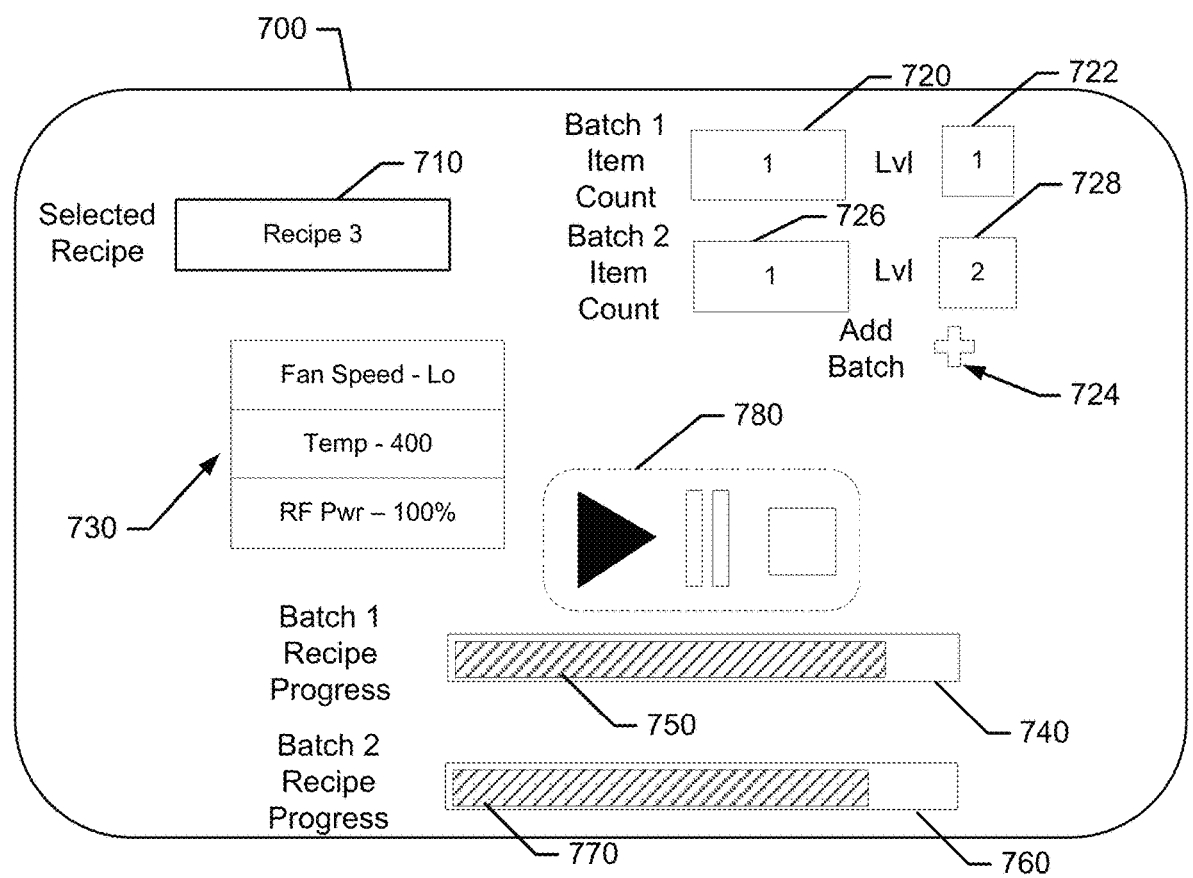
FIG. 6 illustrates a control console interface for selecting a recipe for execution with batches at different locations in accordance with an example embodiment.

In order to account for different locations, the location management module 670 of some example embodiments may provide the user with an ability to inform the location management module 670 as to the location of food items within the cooking chamber 102. To accomplish this, the location management module 670 may be operably coupled to the user interface 570 to receive information indicative of the type or identity of food product being cooked according to a given recipe, and the corresponding location of the food product within the cooking chamber 102. FIG. 6 illustrates an example control console 700 that may be provided for such purposes in accordance with an example embodiment. However, it should be appreciated that other specific interface consoles may be used in alternative embodiments. Moreover, in some cases, the location management module 670 may use RF feedback measurements to determine the location of food products automatically.

As shown in FIG. 6, the control console 700, which may also be referred to as a recipe execution interface, may be displayed via the user interface 570. The control console 700 may indicate the selected recipe 710 and the selected item count 720 for items being cooked according to the selected recipe 710, along with a location indication 722. The location indication 722 may indicate a specific location within the cooking chamber 102 at which the selected item count 720 is physically situated. In the example of FIG. 6, the specified location for the location indication 722 is level 1. Level 1 may correspond to a lower level or tier within the cooking chamber 102 as described in greater detail below. The items positioned at level 1, or more generally all items located at the location indicated by the location indication 722 may be considered to be a first batch or group of items or food products that are all assumed to experience similar cooking parameters during execution of the selected recipe 710.

If another location is to be specified, the user may actuate a batch modification indicator 724 to add additional batches at corresponding locations that are specified. In this regard, a second selected item count 726 is shown to indicate the number of items provided at a second specific location (indicated by second location indication 728) within the cooking chamber 102. In the example of FIG. 6, the specified location for the second location indication 728 is level 2. Level 2 may correspond to an upper level or tier within the cooking chamber 102 as described in greater detail below. The items positioned at level 2, or more generally all items located at the location indicated by the second location indication 728 may be considered to be a second batch or group of items or food products that are all assumed to experience similar cooking parameters during execution of the selected recipe 710. However, the cooking parameters experienced at level 1 may be different than those experienced at level 2. Such difference may be accounted for by the location management module 670 as described in greater detail below.

The selected recipe 710 may correspond to specific oven settings 730 that are defined by the selected recipe 710. In this example, the oven settings 730 may include settings for fan speed, temperature (of the cooking chamber 102), and RF power level. However, in alternative embodiments, other or additional operational parameters may be included in the oven settings 730. The fan speed, temperature and RF power level defined by the selected recipe 710 may be provided into the cooking chamber 102 with the intent that hot air and RF energy are distributed in such a way as to most efficiently cook food products placed in the cooking chamber 102. However, it can be appreciated that hot air may be provided via the air delivery orifices 112 located in the back wall of the cooking chamber 102, and that RF energy is provided via the RF entry points 420 at a predetermined height within the cooking chamber 102. Thus, some localized differences in temperature, airflow and/or RF energy may be experienced within the cooking chamber 102. The location management module 670 may therefore account for the location of each batch (e.g., level 1 vs. level 2), and modify the selected recipe 710 as needed to ensure similar, repeatable, and consistent cooking results regardless of the location within the cooking chamber 102.

To accomplish this, the location management module 670 may include data tables, or other content that is descriptive of cooking parameter (e.g., airflow, temperature and/or RF energy) variations that may occur in the cooking chamber 102 with certain food types or specific food items at the different locations (e.g., level 1 or level 2) within the cooking chamber 102. Since recipes may specify the food type or specific food items being cooked, such information may be obtained from the selected recipe 710. The number of such items (e.g., as indicated by the selected item count 720 and the second selected item count 726) may further indicate a change to cooking parameters that may be accounted for by the location management module 670. In a typical situation, the location management module 670 may not alter fan speed, temperature or RF energy applied into the cooking chamber 102, but may instead modify the time at which food items are retained at their respective locations relative to a nominal cooking time defined by the selected recipe 710. As such, time, which is relatively easy to monitor and manage for each location separately, may be controlled instead of undertaking the otherwise potentially complicated task of trying to alter the other cooking parameters within the cooking chamber 102, which may create other modifications to the selected recipe 710.

In relation to separately tracking cooking times as modified by the location management module 670, the control console 700 may also include a first progress indicator 740 that may be used to track progress relative to completion of the selected recipe 710 for the first batch. The first progress indicator 740 may, in some cases, provide a textual or other indication of the full time commitment associated with execution of the selected recipe 710 at the location indication 722 (i.e., level 1). In other words, the nominal cooking time of the selected recipe 710 may be modified slightly by the location management module 670 to account for the location of the first batch. Meanwhile, a first status indicator 750 may be provided with the first progress indicator 740 to demonstrate what portion of the full time commitment associated with execution of the selected recipe 710 has already been executed for the food product at level 1, as indicated by the location indication 722. In the depicted example, the first status indicator 750 is a bar that grows in size proportional to the fraction of the full time commitment associated with execution of the selected recipe 710 that has transpired. Thus, for example, if the selected recipe 710 calls for a 5 minute full time commitment, the entire space of the first progress indicator 750 may represent 5 minutes plus or minus any modification inserted by the location management module 670. Meanwhile, the first status indicator 750, which fills about 90% of the first progress indicator 850, may indicate that about 4.5 minutes (or 90% of approximately 5 minutes) has transpired toward completion of the selected recipe 710. In some cases, the first status indicator 750 may include text defining a percentage completion and/or defining elapsed time (e.g., in hours, minutes and/or seconds). Similarly, a second progress indicator 760 and second status indicator 770 may be provided for operating similar to the first progress indicator 740 and the first status indicator 750 described above, except for food product located at level 2, as indicated by the second location indication 726. Thus, the second progress indicator 740 may also be adjusted from the nominal cooking time defined by the selected recipe 710 to account for any location specific factors associated with the food product being at level 2, as indicated by the second location indication 726.

The control console 700 may also include an action selector 780. In this example, the action selector 780 includes selectable symbols for start (or cook), pause, and stop operations. A selected one of the symbols may be highlighted to indicate its having been actively selected. However, other presentation and selection paradigms are also possible, including dedicated buttons, a single selectable operator, or many other possible specific instantiations of action selectors. When the action selector 780 is selected for starting (or unpausing), cooking may be initiated.

Figure 9:
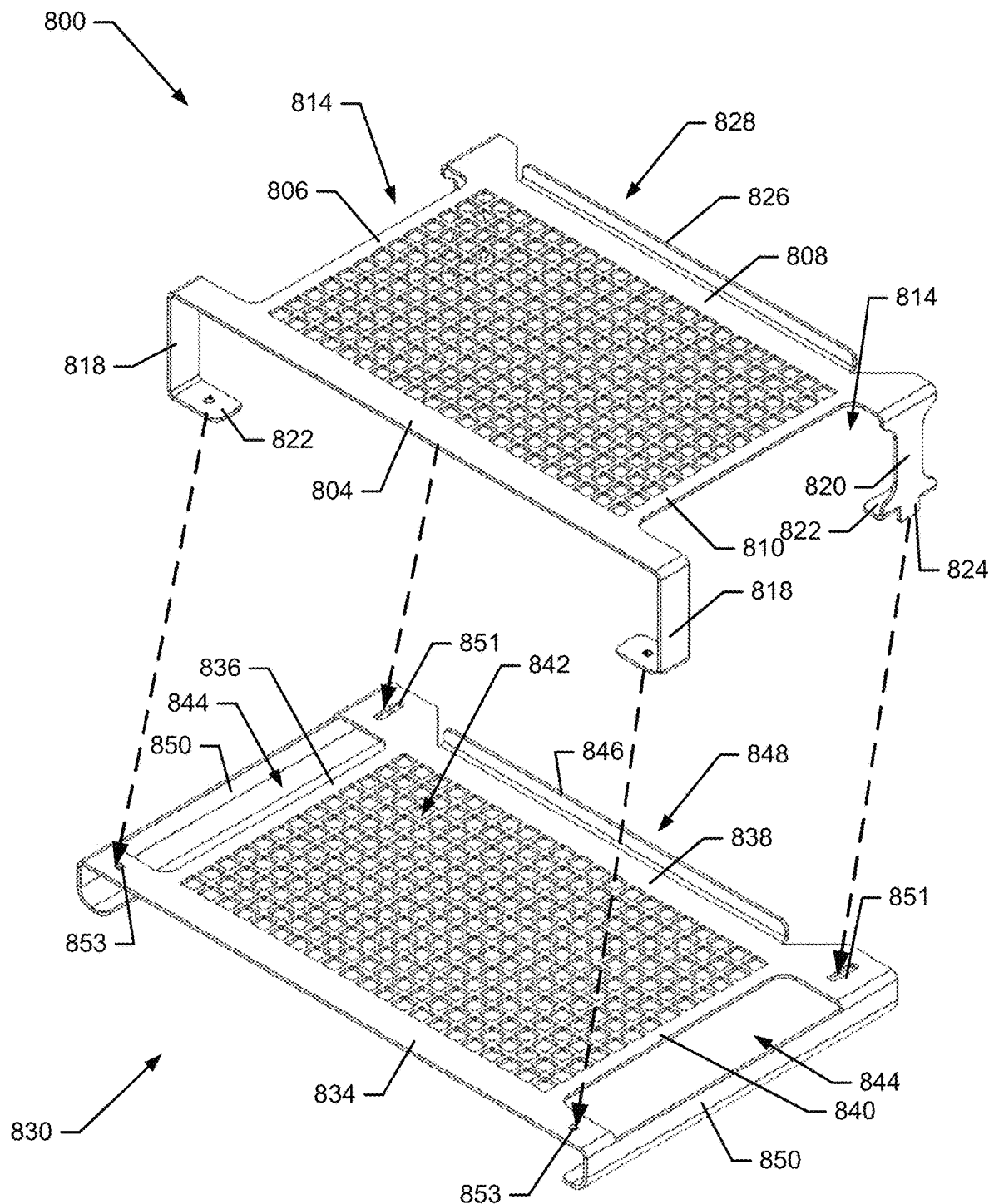
FIG. 9 illustrates a perspective view of the top and bottom tier racks showing how the top tier rack interfaces with the bottom tier rack in accordance with an example embodiment.
Figure 10:
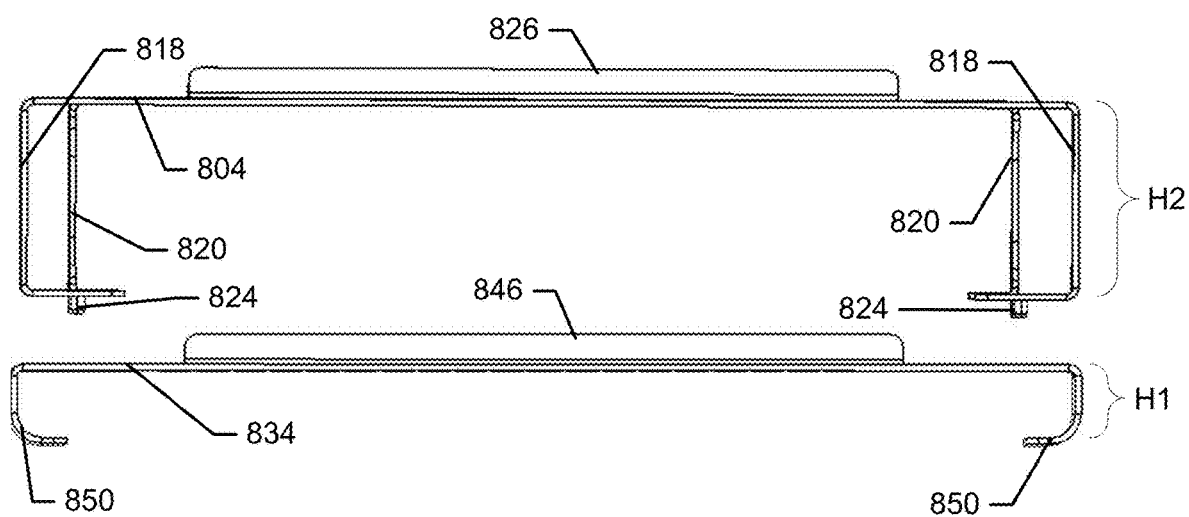
FIG. 10 illustrates a front view of the top and bottom tier racks showing relative height differences between the top tier rack and the bottom tier rack in accordance with an example embodiment.
Figure 11:
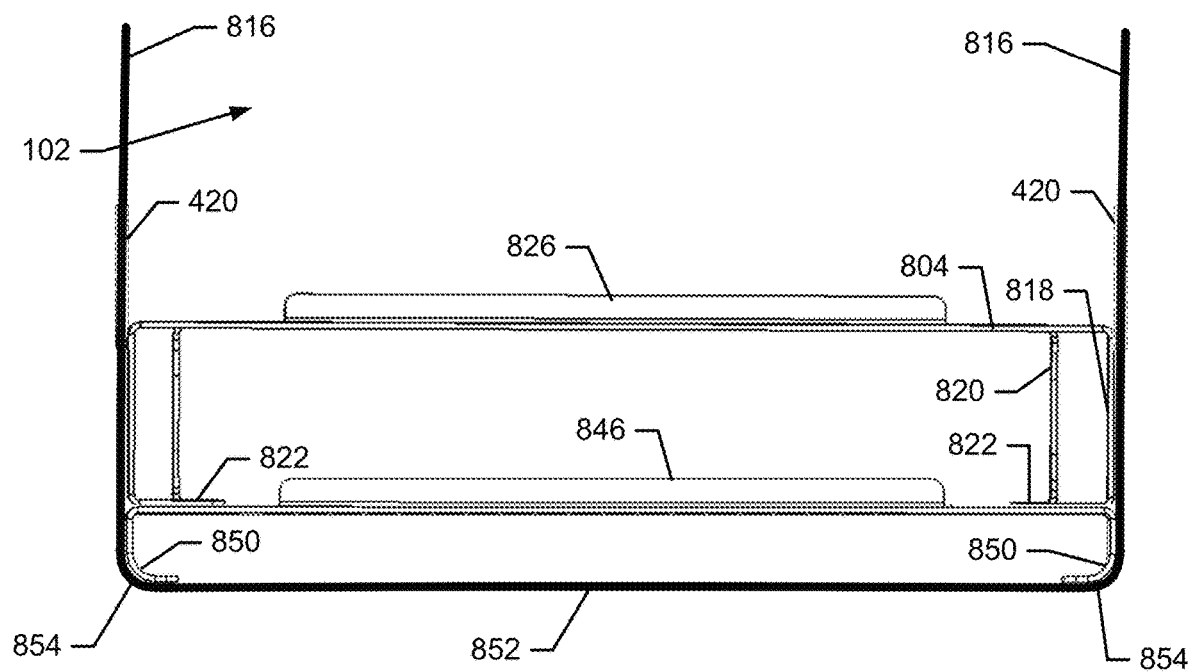
FIG. 11 illustrates placement of the top and bottom tier racks within a cooking chamber of the oven in accordance with an example embodiment.

As noted above, the inclusion of the location management module 670 may enable the user to cook according to the same recipe (i.e., the selected recipe 710) at multiple levels while accounting for any location-based differences in cooking parameters via modifying the selected recipe 710 slightly. To any extent absorption of RF or cooking speed is dependent upon the level (or other location) that is specified, the location management module 670 may also be configured to make modification calculations in consideration of the rates of absorption of RF associated with (or specified to) the location specified for the food product. To be sure that the conditions in the data tables employed by the location management module 670 remain accurate, the respective locations (e.g., a first location corresponding to level 1, and a second location corresponding to level 2, and any subsequent levels and locations that may be added) should be accurately known and consistently repeatable. To achieve such repeatability, one or more elevated rack inserts may be provided for insertion into the cooking chamber 102 to define the different tiers (e.g., level 1, level 2, and any other levels if more inserts are used) at consistent heights, and with consistent and advantageous physical features that have predictable impacts on the cooking parameters (e.g., air flow, temperature and RF power). FIGS. 7-11 illustrate examples of such elevated rack inserts in accordance with an example embodiment. In this regard, FIG. 7 illustrates a perspective view of a top tier rack 800 according to an example embodiment. FIG. 8 illustrates a perspective view of a bottom tier rack 830 according to an example embodiment. FIG. 9 shows the top tier rack 800 and bottom tier rack 830 prior to stacking of the racks. FIG. 10 illustrates a front view of the top tier rack 800 and bottom tier rack 830 prior to stacking of the racks, and FIG. 11 shows a front view of the top tier rack 800 and bottom tier rack 830 stacked and within the cooking chamber 102.

The top tier rack 800 and the bottom tier rack 830 are each individually examples of a cookware appliance that may be used in connection with the oven 100 of FIG. 1. However, it should be appreciated that the combination of the top tier rack 800 and the bottom tier rack 830 is itself also a cookware appliance that may be useable in connection with the oven 100. When combined, the resulting cookware appliance of FIG. 11 is embodied as a multiple-tier elevated rack assembly 900. Although FIG. 11 shows the multiple-tier elevated rack assembly 900 having two tiers, some embodiments may include more than just two tiers.

As shown in FIGS. 7-11, the top tier rack 800 and the bottom tier rack 830 may each be substantially rectangular in shape (when viewed from above or below) to substantially match a shape of the cooking chamber 102 when viewed in a horizontal cross section. However, various aspects of the shape and structure of the top tier rack 800 and the bottom tier rack 830 are provided to specifically influence (or avoid influencing) impacts on airflow and RF energy distribution in the cooking chamber 102, and to position the top tier rack 800 and the bottom tier rack 830 strategically in elevation within the cooking chamber 102. Some aspects of these structures and shapes will be described below.

In this regard, for example the top tier rack 800 includes a frame 802 that extends around a periphery of a top surface or supporting surface of the top tier rack 800. The frame 802 includes a first frame member 804, a second frame member 806, a third frame member 808 and a fourth frame member 810. The first frame member 804 extends substantially perpendicular to the second and fourth frame members 806 and 810, which each connect (at respective ends thereof) to portions of the first frame member 804 near respective opposite ends of the first frame member 804. The first frame member 804 also extends substantially parallel to the third frame member 808. The third frame member 808 extends between the opposite ends of the second and fourth frame members 806 and 810 relative to the ends of the second and fourth frame members 806 and 810 that connect to the first frame member 804. The second and fourth frame members 806 and 810 also extend substantially perpendicular to the third frame member 808.

The top tier rack 800 further includes a grate structure 812 that is disposed to lie in the same plane as the frame 802 and cover an entirety of the area defined between the frame members of the frame 802. The grate structure 812 of FIG. 4 is formed as a grid of rectangular holes that are formed between members that extend parallel relative to respective ones of the frame members at a constant interval therebetween. The constant interval, and spacing, of the rectangular holes are designed to make the top tier rack 800 effectively appear solid relative to the RF frequencies employed by the oven 100. In some embodiments, the grate structure 812 may include wires, bars, or other members that extend substantially parallel (and/or perpendicular) to the first and third frame members 804 and 808 and substantially perpendicular (or parallel) to the second and fourth frame members 806 and 810. The grate structure 812 may be integrally formed between the frame members. However, in other cases, the grate structure 812 may be joined to the frame members by welding, by being pinched between portions of the frame members, or by another form of adhesion.

The first and third frame members 804 and 808 may be elongated past respective ends of the second and fourth frame members 806 and 810 to create a lateral gap 814 that will be formed between each of the first and fourth members 806 and 810 and a corresponding nearest one of the sidewalls 816 of the cooking chamber 102. Meanwhile, front legs 818 may extend substantially perpendicularly away from opposite ends of the first frame member 804 in a downward direction. Similarly, rear legs 820 may extend substantially perpendicularly away from opposite ends of the third frame member 808 in the downward direction. In an example embodiment, the front legs 818 may extend downwardly proximate to the sidewalls 816 of the cooking chamber 102. Meanwhile, the rear legs 820 may be spaced apart from the sidewalls 816 as shown in FIG. 11. As such, the third frame member 808 may be slightly shorter than the first frame member 804. Whereas the first frame member 804 may have a length that is substantially equal to a distance between the sidewalls 816, the third frame member 808 may be shorter than the distance between the sidewalls 816.

At distal ends of the front and rear legs 818 and 820, respective feet 822 may be formed. The feet 822 may extend substantially perpendicular to the direction of extension of the front and rear legs 818 and 820 (inwardly and away from the sidewalls 816 of the cooking chamber 102). The feet 822 may rest on the rack 104 of FIG. 1, or the bottom tier rack 830 of FIG. 8, as shown in FIG. 11. In an example embodiment, the feet 822 may include protruding members 824 that extend downward past the feet 822 in the same direction as the direction of extension of the front and rear legs 818 and 820. The protruding members 824 may engage a portion of the rack 104 or bottom tier rack 830 as described in greater detail below, and as shown in FIG. 11.

As best seen in FIG. 7, the third frame member 808 may further include a shoulder member 826 that extends along a portion of the third frame member 808 that is coextensive with the grate structure 812. The shoulder member 826 may extend perpendicularly away from the third frame member 808 in an upward direction (i.e., opposite the direction of extension of the front and rear legs 818 and 820). The shoulder member 826 may also be spaced apart from a back wall of the cooking chamber 102 when the top tier rack 800 thereby creating a rear gap 828 between the back wall of the cooking chamber 102 and the shoulder member 826. The shoulder member 826 may prevent insertion of a pan or any food item all the way to the back wall of the cooking chamber 102, since such insertion may otherwise block airflow. The holes of the grate structure 812, the rear gap 828 and the lateral gaps 814 may each be formed to allow airflow to move with minimal obstruction through the cooking chamber 102, and more particularly through and around the top tier rack 800.

The bottom tier rack 830 may include a frame 832 that is structured in similar fashion to the structure described above for the frame 802 of the top tier rack 800, so a specific description of the structure of the first frame member 834, second frame member 836, third frame member 838 and fourth frame member 840 would be redundant and will not be repeated. However, it should be noted that the first and third frame members 834 and 838 of the bottom tier rack 830 may each be the same length. Grate structure 842 is also similarly structured to the grate structure 812 described above, so details will not be repeated. Lateral gaps 844 are also formed similar to the lateral gaps 814 described above. The bottom tier rack 830 also includes a shoulder member 846 that is situated and structured similar to the shoulder member 826 above, including the formation of rear gap 848 similar to rear gap 828 described above.

The bottom tier rack 830 differs from the top tier rack 800, however, in relation to the support structures that are provided for the components of the bottom tier rack 830 described above. In this regard, rather than employing separate legs and feet disposed in respective corners of the frame 832, the bottom tier rack 830 employs a support assembly 850 that is shaped to match a corresponding shape of the lower internal corners of the cooking chamber 102. In this regard, sidewalls 816 of the cooking chamber 102 may intersect a bottom wall 852 of the cooking chamber 102 at respective rounded corners 854. One instance of the support assembly 850 may therefore extend from respective first ends of the first and third frame members 834 and 838, and the other instance of the support assembly 850 may extend from opposite respective second ends of the first and third frame members 834 and 838. As shown in FIG. 8, receiving slots 851 may be formed proximate to respective opposite ends of the third frame member 838 and receiving orifices 853 may be formed proximate to respective opposite ends of the first frame member 834 to receive the protruding members 824 of the feet 822 of the top tier rack 800 in order to prevent any sliding of the top tier rack 800 relative to the bottom tier rack 830.

In this example embodiment, the cooking chamber 102 is formed to have the rounded corners 854 at the intersection of the bottom wall 852 and the sidewalls 816 since sharp, perpendicular corners are more difficult to clean. The rounded corners 854 present an easier surface to keep clean at a portion of the cooking chamber 102 that is most susceptible (contrary to the top corners) to becoming fouled by drippings and splatter of the food product during cooking or insertion into/removal from the cooking chamber 102.

When inserted into the cooking chamber 102, the support assembly 850 may substantially cover an entirety of the otherwise exposed surfaces of the rounded corners 854. The support assembly 850 would then receive any drippings or splatter, and could be cleaned outside the cooking chamber 102 more easily after removal thereof, while keeping the rounded corners 854 themselves substantially clean.

The support assembly 850 has a height (H1) that is sufficient to elevate the grate structure 342 above a top level of the air delivery orifices 112 in the back wall of the cooking chamber 102. Meanwhile, a height (H2) of the front and rear legs 818 and 820 of the top tier rack 800 may be between 2 and 2.5 times the height (H1) of the support assembly 850. As shown in FIG. 11, setting the relative heights in this way (in addition to ensuring that the air deliver orifices 112 are not blocked, as noted above) provides a consistent and known positioning of the elevation of the top tier rack 800 relative to the RF entry points 420 formed in the sidewalls 816. In this regard, the entry points 420 may, in some cases, at least partially overlap with the grate structure 812 of the top tier rack 800. In other words, part of the opening that defines the RF entry points 420 may extend in the sidewalls 816 below the grate structure 812 and part of the opening may extend above the grate structure 812. The lateral gaps 814 of the top tier rack 800 (and in some cases also the lateral gaps 844 of the bottom tier rack 830) may be formed to be about one half a wavelength in length. Thus, the grate structure 812 (and the second and fourth frame members 806 and 810) may be positioned at least ½ wavelength away from the RF entry points 420. This strategic positioning may ensure that the RF energy inserted into the cooking chamber 102 is not obstructed in its ability to fill the cooking chamber 102 evenly, even when the top tier rack 800 is inserted in the cooking chamber 102.

As can be appreciated from the descriptions above, the lateral gaps 814 and 844, the rear gaps 828 and 848, and the holes in the grate structures 812 and 842 may support (or at least minimize inhibition of) general airflows within the cooking chamber 102 and more specifically of vertical airflows upward (or downward) through the grate structures 812 and 842. Meanwhile, the relative heights of the top tier rack 800 and the bottom tier rack 830 are selected to strategically place the top tier rack 800 relative to RF entry points 420 to avoid any negative impacts on RF distribution in the cooking chamber 102. Example embodiments therefore enable the efficient use of space inside the cooking chamber 102 to define more capacity for simultaneously cooking food items of different respective batches at corresponding different locations. Moreover, the location management module 670 may be configured to account for any known differences associated with RF absorption at each of the different locations.

In an example embodiment, the frame members, the grate structure, legs, feet, and/or support assembly of the top tier rack 800 and bottom tier rack 830 may be made from aluminum. However, alternative materials may be used in other embodiments, such as, for example, stainless steel.

In an example embodiment, an oven (and/or a multi-tiered rack assembly of the oven) may be provided. The oven may include a cooking chamber, a convective heating system configured to provide heated air into the cooking chamber, a radio frequency (RF) heating system configured to provide RF energy into the cooking chamber, a bottom tier rack that is removable from and insertable into the cooking chamber to be supported at a bottom wall of the cooking chamber, and a top tier rack that is removable from and insertable into the cooking chamber to be supported by the bottom tier rack. The bottom tier rack includes a first frame including a plurality of first frame members that surround a first grate structure. The top tier rack includes a second frame including a plurality of second frame members that surround a second grate structure. Each of the bottom tier rack and the top tier rack may define a lateral gap proximate to sidewalls of the cooking chamber and a rear gap proximate to a back wall of the cooking chamber to permit, along with the first and second grate structures, airflow vertically through, along sides, and along a back of the bottom and top tier racks, respectively.

In some embodiments, additional optional features may be included or the features described above may be modified or augmented. Each of the additional features, modification or augmentations may be practiced in combination with the features above and/or in combination with each other. Thus, some, all or none of the additional features, modification or augmentations may be utilized in some embodiments. For example, in some cases, the back wall of the cooking chamber may include air delivery orifices forming a rectangular array of holes in a back wall of the cooking chamber proximate to a bottom wall of the cooking chamber, and a height of the bottom tier rack may be sufficient to position the first grate structure above a top of the air delivery orifices. In an example embodiment, a height of the top tier rack is between about two and two and a half times the height of the bottom tier rack. In some cases, an RF entry point may be disposed in a sidewall of the cooking chamber via which the RF energy is distributed into the cooking chamber, and the height of the top tier rack may be sufficient to place the second grate structure such that a first portion of the RF entry point extends below the second grate structure, and a second portion of the RF entry point extends above the second grate structure. In an example embodiment, the lateral gap of each of the top tier rack and the bottom tier rack may be about one half wavelength relative to frequencies used to apply the RF energy. In some cases, the top and bottom tier racks may each include a shoulder member disposed proximate the back wall of the cooking chamber, the shoulder member being spaced apart from the back wall by the rear gap, and the shoulder member of each of the top and bottom tier racks may extend substantially perpendicularly away from a plane in which the first and second grate structures, respectively, lie. In an example embodiment, the top tier rack may include legs disposed at respective corners of the second grate structure, and feet that extend substantially perpendicular to the legs and substantially parallel to the second grate structure to lie on a portion of the first grate structure. In some cases, protruding members may extend from the feet to be inserted into corresponding openings formed proximate to respective corners of the bottom tier rack. In an example embodiment, an intersection of the sidewalls of the cooking chamber and a bottom wall of the cooking chamber forms rounded corners, and the first grate structure may be supported relative to the bottom wall by a support assembly, while the support assembly is shaped to conform to a shape of the rounded corners. In some cases, the support assembly may extend from the back wall of the cooking chamber to a front portion of the cooking chamber to substantially cover the rounded corners. In an example embodiment, holes formed in the first and second grate structures may be sized to make the first and second grate structures appear solid relative to frequencies used to apply the RF energy. In some cases, the oven may further include a location management module configured to employ location-specific recipe variants based on whether food product is located on the first grate structure of the second grate structure. Alternatively or additionally, the location management module may be configured to modify a nominal recipe based on whether food product is located on the first grate structure of the second grate structure. Alternatively or additionally, the location management module may be configured to separately track cooking progress for food items located on the first grate structure and the second grate structure, respectively.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An oven comprising:
a cooking chamber;
a convective heating system configured to provide heated air into the cooking chamber;
a radio frequency (RF) heating system configured to provide RF energy into the cooking chamber;
a bottom tier rack that is removable from and insertable into the cooking chamber to be supported at a bottom wall of the cooking chamber, the bottom tier rack comprising a first frame including a first front frame member, a first rear frame member extending parallel to the first front frame member, and a pair of first side frame members that surround a first grate structure; and
a top tier rack that is removable from and insertable into the cooking chamber to be supported by the bottom tier rack, the top tier rack comprising a second frame including a second front frame member, a second rear frame member extending parallel to the second front frame member, and a pair of second side frame members that surround a second grate structure,
wherein each of the bottom tier rack and the top tier rack define a lateral gap proximate to sidewalls of the cooking chamber extending continuously from respective portions of the first and second frames to the sidewalls and a rear gap proximate to a back wall of the cooking chamber extending continuously from respective portions of the first and second frames to the back wall to permit, along with the first and second grate structures, airflow vertically through, along sides, and along a back of the bottom and top tier racks, respectively, and
wherein the first front and first rear frame members are elongated past respective ends of the first side frame members to define that lateral gap proximate to opposite sides of the first frame, and the second front and second rear frame members are elongated past respective ends of the second side frame members to define the lateral gap proximate to opposite sides of the second frame.

2. The oven of claim 1, wherein the back wall of the cooking chamber comprises air delivery orifices forming a rectangular array of holes in the back wall of the cooking chamber proximate to the bottom wall of the cooking chamber, and
wherein a height of the bottom tier rack is sufficient to position the first grate structure above a top of the air delivery orifices.

3. The oven of claim 2, wherein a height of the top tier rack is between two and two and a half times the height of the bottom tier rack.

4. The oven of claim 3, wherein an RF entry point is disposed in a sidewall of the cooking chamber via which the RF energy is distributed into the cooking chamber, and
wherein the height of the top tier rack is sufficient to place the second grate structure such that a first portion of the RF entry point extends below the second grate structure, and a second portion of the RF entry point extends above the second grate structure.

5. The oven of claim 1, wherein the lateral gap of each of the top tier rack and the bottom tier rack is one half wavelength relative to a frequency used to apply the RF energy.

6. The oven of claim 1, wherein the top and bottom tier racks each include a shoulder member disposed proximate the back wall of the cooking chamber, the shoulder member being spaced apart from the back wall by the rear gap, and
wherein the shoulder member of each of the top and bottom tier racks extends substantially perpendicularly away from a plane in which the first and second grate structures, respectively, lie.

7. The oven of claim 1, wherein the top tier rack comprises legs disposed at respective corners of the second grate structure,
wherein feet extend substantially perpendicular to the legs and substantially parallel to the second grate structure to lie on a portion of the first grate structure.

8. The oven of claim 7, wherein protruding members extend from the feet to be inserted into corresponding openings formed proximate to respective corners of the bottom tier rack.

9. The oven of claim 1, wherein an intersection of the sidewalls of the cooking chamber and the bottom wall of the cooking chamber forms rounded corners, and
wherein the first grate structure is supported relative to the bottom wall by a support assembly, and
wherein the support assembly is shaped to conform to a shape of the rounded corners.

10. The oven of claim 9, wherein the support assembly extends from the back wall of the cooking chamber to a front portion of the cooking chamber having rounded support surfaces that provide full surficial contact with respective rounded corners.

11. The oven of claim 1, wherein holes formed in the first and second grate structures are sized to make the first and second grate structures appear solid relative to frequencies used to apply the RF energy.

12. The oven of claim 1, further comprising a location management module configured to employ location-specific recipe variants based on whether food product is located on the first grate structure or the second grate structure.

13. The oven of claim 1, further comprising a location management module configured to modify a nominal recipe based on whether food product is located on the first grate structure or the second grate structure.

14. The oven of claim 1, further comprising a location management module configured to separately track cooking progress for food items located on the first grate structure and the second grate structure, respectively.

15. A multi-tier rack assembly for use in an oven comprising a cooking chamber, a convective heating system configured to provide heated air into the cooking chamber, and a radio frequency (RF) heating system configured to provide RF energy into the cooking chamber, the assembly comprising:
- a bottom tier rack that is removable from and insertable into the cooking chamber to be supported at a bottom wall of the cooking chamber, the bottom tier rack comprising a first frame including a first front frame member, a first rear frame member extending parallel to the first front frame member, and a pair of first side frame members that surround a first grate structure; and
- a top tier rack that is removable from and insertable into the cooking chamber to be supported by the bottom tier rack, the top tier rack comprising a second frame including a second front frame member, a second rear frame member extending parallel to the second front frame member, and a pair of second side frame members that surround a second grate structure,
- wherein each of the bottom tier rack and the top tier rack define a lateral gap proximate to sidewalls of the cooking chamber extending continuously from respective portions of the first and second frames to the sidewalls and a rear gap proximate to a back wall of the cooking chamber extending continuously from respective portions of the first and second frames to the back wall to permit, along with the first and second grate structures, airflow vertically through, along sides, and along a back of the bottom and top tier racks, respectively, and
- wherein the first front and first rear frame members are elongated past respective ends of the first side frame members to define that lateral gap proximate to opposite sides of the first frame, and the second front and second rear frame members are elongated past respective ends of the second side frame members to define the lateral gap proximate to opposite sides of the second frame.

16. The assembly of claim 15, wherein a height of the top tier rack is between two and two and a half times the height of the bottom tier rack.

17. The assembly of claim 15, wherein the lateral gap of each of the top tier rack and the bottom tier rack is one half wavelength relative to a frequency used to apply the RF energy.

18. The assembly of claim 15, wherein the top and bottom tier racks each include a shoulder member disposed proximate the back wall of the cooking chamber, the shoulder member being spaced apart from the back wall by the rear gap, and
- wherein the shoulder member of each of the top and bottom tier racks extends substantially perpendicularly away from a plane in which the first and second grate structures, respectively, lie.

19. The assembly of claim 15, wherein the top tier rack comprises legs disposed at respective corners of the second grate structure,
- wherein feet extend substantially perpendicular to the legs and substantially parallel to the second grate structure to lie on a portion of the first grate structure.

20. The assembly of claim 19, wherein protruding members extend from the feet to be inserted into corresponding openings formed proximate to respective corners of the bottom tier rack.

* * * * *